United States Patent
Ito et al.

(10) Patent No.: US 9,545,887 B2
(45) Date of Patent: Jan. 17, 2017

(54) WIRE HARNESS STRUCTURE AND ELECTRONIC DEVICE CONTROL SYSTEM

(71) Applicant: Yazaki Corporation, Tokyo (JP)

(72) Inventors: Ken Ito, Susono (JP); Yoshihito Aoki, Susono (JP); Shuji Satake, Susono (JP)

(73) Assignee: Yazaki Corporation, Tokyo (JP)

( * ) Notice: Subject to any disclaimer, the term of this patent is extended or adjusted under 35 U.S.C. 154(b) by 553 days.

(21) Appl. No.: 14/140,689

(22) Filed: Dec. 26, 2013

(65) Prior Publication Data

US 2014/0103715 A1     Apr. 17, 2014

Related U.S. Application Data

(63) Continuation-in-part of application No. PCT/JP2012/066492, filed on Jun. 28, 2012.

(30) Foreign Application Priority Data

Jun. 30, 2011    (JP) .................................. 2011-145294

(51) Int. Cl.
*B60R 16/02*    (2006.01)
*H04L 12/40*    (2006.01)
(Continued)

(52) U.S. Cl.
CPC ....... *B60R 16/0207* (2013.01); *B60R 16/0315* (2013.01); *H04L 12/40013* (2013.01);
(Continued)

(58) Field of Classification Search
CPC ..... B60R 16/00; H04L 12/00; G05B 2219/00; H01R 4/2433; H01R 13/665; B60J 5/0416
(Continued)

(56) References Cited

U.S. PATENT DOCUMENTS 6,469,404 B1    10/2002    Pohjola
7,899,954 B2    3/2011    Kanazawa et al.
(Continued)

FOREIGN PATENT DOCUMENTS

EP    0341080 A2    11/1989
EP    0791506 A2    8/1997
(Continued)

OTHER PUBLICATIONS

Supplementary International Search Report dated Feb. 5, 2015, issued for the European patent application No. 12804022.7.
(Continued)

*Primary Examiner* — Jung Kim
*Assistant Examiner* — James Evans
(74) *Attorney, Agent, or Firm* — Locke Lord LLP (57) ABSTRACT

Provided is a wire harness which does not increase in size with increase in number of electronic devices controlled by an electronic control unit and can standardize a relay connector, and an electronic device control system including such wire harness. A wire harness structure (2) communicably-connects electronic devices (3) mounted on a vehicle to an electronic control unit (4) controlling the electronic devices, and includes a relay connector (6, 6A, 6B) relaying a control signal from the electronic control unit to the electronic devices, a power wire (81) and a ground wire (82) drawn out from the relay connector, power supply units connected to the power wire and the ground wire, and sets of signal wires (83a, 83b, 83c) transmitting the control signal to each power supply unit arranged to supply power to the electronic device and drive the electronic device according to the control signal from the signal wire.

11 Claims, 9 Drawing Sheets

(51) Int. Cl.
*B60R 16/03* (2006.01)
*H04L 12/64* (2006.01)
*H01R 4/24* (2006.01)
*H01R 13/66* (2006.01)

(52) U.S. Cl.
CPC .... *H04L 12/40045* (2013.01); *H04L 12/6418* (2013.01); *G05B 2219/21076* (2013.01); *G05B 2219/2637* (2013.01); *H01R 4/2433* (2013.01); *H01R 13/665* (2013.01); *H04L 2012/40273* (2013.01); *Y10T 307/305* (2015.04); *Y10T 307/352* (2015.04); *Y10T 307/50* (2015.04)

(58) Field of Classification Search
USPC .................................................. 307/10.1, 9.1
See application file for complete search history.

(56) References Cited

U.S. PATENT DOCUMENTS 8,461,726 B2  6/2013  Maki
2010/0207744 A1  8/2010  Lammers et al.
2011/0119507 A1  5/2011  Reidt

FOREIGN PATENT DOCUMENTS

| JP | 2001-523615 A | 11/2001 |
| JP | 2008-225673 A | 9/2008 |
| JP | 2010-033960 A | 2/2010 |
| JP | 2010-111373 A | 5/2010 |
| WO | WO-95/15594 A1 | 6/1995 |
| WO | WO-97/02965 A1 | 1/1997 |
| WO | WO-99/25585 A2 | 5/1999 |
| WO | WO-99/25586 A2 | 5/1999 |
| WO | WO-99/26331 A1 | 5/1999 |

OTHER PUBLICATIONS

International Search Report dated Oct. 2, 2012, issued for PCT/JP2012/066492.

Notification of Reasons for Refusal mailed Apr. 28, 2015, issued for the Japanese patent application No. 2011-145294 and English translation thereof.

FIG. 12
PRIOR ART

WIRE HARNESS STRUCTURE AND ELECTRONIC DEVICE CONTROL SYSTEM

TECHNICAL FIELD

The present invention relates to a wire harness structure arranged to communicably-connect a plurality of electronic devices to be mounted on a vehicle to an electronic control unit controlling these electronic devices, and relates to an electronic device control system having said wire harness structure.

BACKGROUND ART

Vehicles such as a passenger vehicle and a freight vehicle are mounted with various electronic devices constituting an air conditioner, a wiper, a power window and such. These electronic devices are electrically-connected to an electronic control unit (ECU) including a computer and such by a wire harness. Electric power and a control signal and such are transmitted between these electronic devices and the ECU via the wire harness. Such wire harness includes a plurality of electric wires and a connector for receiving a terminal fitting connected to an end of the electric wire.

Conventionally, the ECU includes an input-output portion per electronic device connected to the ECU, and thus it requires a dedicated electric wire per electronic device. Thus, as the number of electronic devices controlled by the ECU increases, the number of electric wires of the wire harness for connecting the ECU with the electronic devices is increased. As a result, there are problems of an increase in the cost of the wire harness, a decrease in wiring property and an increase in weight, to name a few.

The inventors of the present invention had proposed a technology for solving such problem, as disclosed in Patent Literature 1. A wire harness provided to an electronic device control system disclosed in Patent Literature 1 as well as an electronic device control system 101 shown in FIG. 12, for example, are provided with a relay connector 106 having a communication control mechanism, the relay connector 106 being arranged to relay the communication between a plurality of electronic devices 103 and an ECU (not shown).

Figure 12:
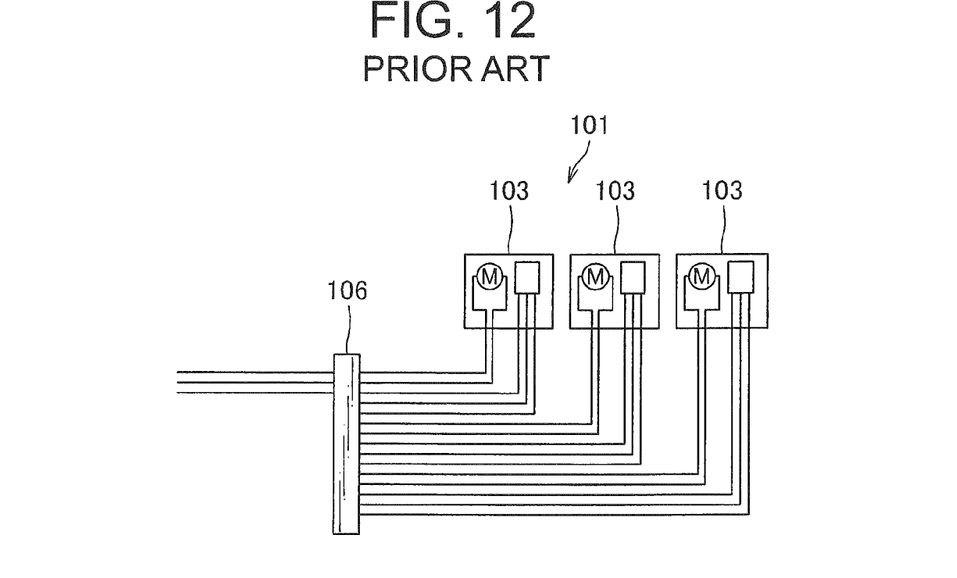
FIG. 12 illustrates a configuration of a conventional electronic device control system.

The relay connector 106 is provided between the plurality of electronic devices 103 and the ECU. The communication between the ECU and the relay connector 106 is multiplexed, and the relay connector 106 transmits a control signal from the electronic control unit to the electronic device 103 corresponding to the identification data contained in said control signal. In this manner, the communication between the ECU and the relay connector 106 is multiplexed. Thus, the electronic control unit and the relay connector 106 can be connected to each other without using a dedicated electric wire per electronic device 103, thereby reducing the number of electric wires connecting the electronic control unit with the relay connector 106.

However, in the electronic device control system 101 shown in FIG. 12, the relay connector 106 is provided with a chip which functions as a power supply unit for supplying electric power to the electronic devices 103 in accordance with the control signal from the electronic control unit transmitted to the electronic device 103 corresponding to the identification data. Thus, it is necessary to provide a dedicated chip per electronic device 103. Consequently, as the number of electronic devices 103 increases, the number of chips mounted to the relay connector 106 is increased. Thus, there is a problem that the size of the relay connector 106 itself is increased, causing a decrease in mountability to the vehicle.

Furthermore, it is necessary to change the kind of the chip or the chip itself mounted on the relay connector 106 when the specification is changed, for example when the number of electronic devices 103 is increased or decreased or the power of the electronic device 103 is changed. Thus, it is necessary to prepare the relay connectors 106 mounted with the chips corresponding to the respective combinations of these electronic devices 103 to be mounted on the vehicle. Thus, it is difficult to standardize the relay connector 106, and thus the kind of the relay connector 106 is increased, thereby increasing the cost.

CITATION LIST

Patent Literature

Patent Literature 1: Japan Patent Application Publication No. 2008-225673

SUMMARY OF INVENTION

Problem to be Solved

The present invention aims to solve the above-mentioned problem. Thus, an object of the present invention is to provide a wire harness which does not increase in size with an increase in the number of electronic devices controlled by an electronic control unit and which can achieve the standardization of a relay connector, and to provide an electronic device control system including such wire harness.

Solution to Problem

In order to achieve the above-described object, the present invention provides, in a first aspect, a wire harness structure arranged to communicably-connect a plurality of electronic devices to be mounted on a vehicle with an electronic control unit controlling the plurality of electronic devices, the wire harness structure including: a relay connector arranged to relay a control signal from the electronic control unit to the plurality of electronic devices; a power wire and a ground wire drawn out from the relay connector, each including one wire; a plurality of power supply units connected to the power wire and the ground wire; and a plurality of signal wires transmitting the control signal to each of the plurality of power supply unit, wherein the power supply unit supplies power to the electronic device and drives the electronic device in accordance with the control signal from the signal wire.

In order to achieve the above-described object, the present invention provides, in a second aspect, the wire harness structure described above, wherein the power supply unit is embedded in a connector connecting the electronic device to the power wire, the ground wire and the signal wire.

In order to achieve the above-described object, the present invention provides, in a third aspect, the wire harness structure described above, wherein the connector includes a plurality of solderless terminals, wherein the power wire, the ground wire and the signal wires transmitting the control signal corresponding to one electronic device of the plurality of electronic devices are press-fitted and connected to the plurality of solderless terminals, and wherein the solderless terminal is electrically-connected to the power supply unit.

In order to achieve the above-described object, the present invention provides, in a fourth aspect, the wire harness structure described above, wherein the connector includes a base plate portion having one surface arranged to be mounted with the plurality of solderless terminals, wherein the other surface of the base plate portion is provided with a groove portion formed concave with respect to the other surface, the groove portion being arranged to house the signal wires transmitting the control signal corresponding to the electronic device other than said one electronic device.

In order to achieve the above-described object, the present invention provides, in a fifth aspect, the wire harness structure described above, further including: a first cover portion covering the plurality of solderless terminals mounted on the one surface of the base plate portion; and a second cover portion covering an opening of the groove portion.

In order to achieve the above-described object, the present invention provides, in a sixth aspect, an electronic device control system including: a plurality of electronic devices to be mounted on a vehicle; an electronic control unit controlling the plurality of electronic devices; and the wire harness structure described above arranged to communicatably-connect the plurality of electronic devices with the electronic control unit, wherein the wire harness structure includes a second signal wire transmitting the control signal from the electronic control unit to the relay connector.

In order to achieve the above-described object, the present invention provides, in a seventh aspect, the electronic device control system described above, wherein the electronic control unit or the relay connector includes an integrated control unit arranged to control such that supply quantity of power to the plurality of electronic devices does not exceed a predetermined constant value.

Advantageous Effects of Invention

As described above, according to the invention described in the first aspect and the sixth aspect, the plurality of power supply units which supply power to the respective electronic devices in accordance with the control signal from the electronic control unit is connected to the power wire and the ground wire drawn out from the relay connector, the power wire and the ground wire each including one wire. That is, the power supply unit is provided at outside of the relay connector. Thus, the relay connector does not increase in size even if the number of electronic devices controlled by the electronic control unit is increased, and also, it eliminates the need for preparing the relay connector for each of combinations of the plurality of electronic devices to be mounted to the vehicle, thereby achieving the standardization of the relay connector. Consequently, there is provided the wire harness structure having improved design performance and improved productivity and which can reduce the cost, and there is also provided the electronic device control system having such wire harness structure.

As described above, according to the invention described in the second aspect, the power supply unit is embedded in the connector connecting the electronic device to the power wire, the ground wire and the signal wires. Thus, the electronic device and the connector can be electrically-connected to each other by connector coupling the electronic device with the connector in which the power supply unit is embedded, thereby improving the assembling workability. In addition, the connector in which the power supply unit is embedded can be commonly-used for the plurality of electronic devices, thus the connector can be standardized, thereby improving design performance and productivity and thus reducing the cost.

As described above, according to the invention described in the third aspect, the power wire can be electrically-connected to the signal wires transmitting the control signal corresponding to one electronic device of the plurality of electronic devices, simply by press-fitting the power wire, the ground wire and the signal wires transmitting the control signal corresponding to one electronic device of the plurality of electronic devices to the plurality of solderless terminals, respectively. Thus, the assembling workability is improved even more.

As described above, according to the invention described in the fourth aspect, the connector includes the base plate portion having one surface arranged to be mount with the plurality of solderless terminals, and the other surface of the base plate portion is provided with the groove portion formed concave with respect to the other surface, the groove portion being arranged to house the signal wires transmitting the control signal corresponding to the electronic device other than said one electronic device. Thus, the signal wires transmitting the control signal corresponding to the electronic device other than said one electronic device can be wired in a non-voluminous and organized fashion, thereby downsizing the wire harness structure.

As described above, according to the invention described in the fifth aspect, the first cover portion covering the plurality of solderless terminals mounted on the one surface of the base plate portion and the second cover portion covering an opening of the groove portion are provided. Thus, the power wire, the signal wires transmitting control signal corresponding to one electronic device of the plurality of electronic device and the signal wires transmitting control signal corresponding to the electronic device other than said one electronic device, which are press-fitted to the plurality of solderless terminals, can be protected and fixed between the first cover portion and the second cover portion.

As described above, according to the invention described in the seventh aspect, the relay connector includes the integrated control unit arranged to control such that the supply quantity of power to the plurality of electronic devices does not exceed a predetermined constant value. Thus, the supply quantity of power to the plurality of electronic devices can be equalized. Consequently, the signal wire drawn out from the relay connector can have a small diameter and can be downsized.

DESCRIPTION OF EXEMPLARY EMBODIMENTS

In the following, one embodiment of an electronic device control system and a wire harness structure constituting the electronic device control system according to the present invention are explained in reference to FIGS. 1 through 7.

Figure 1:
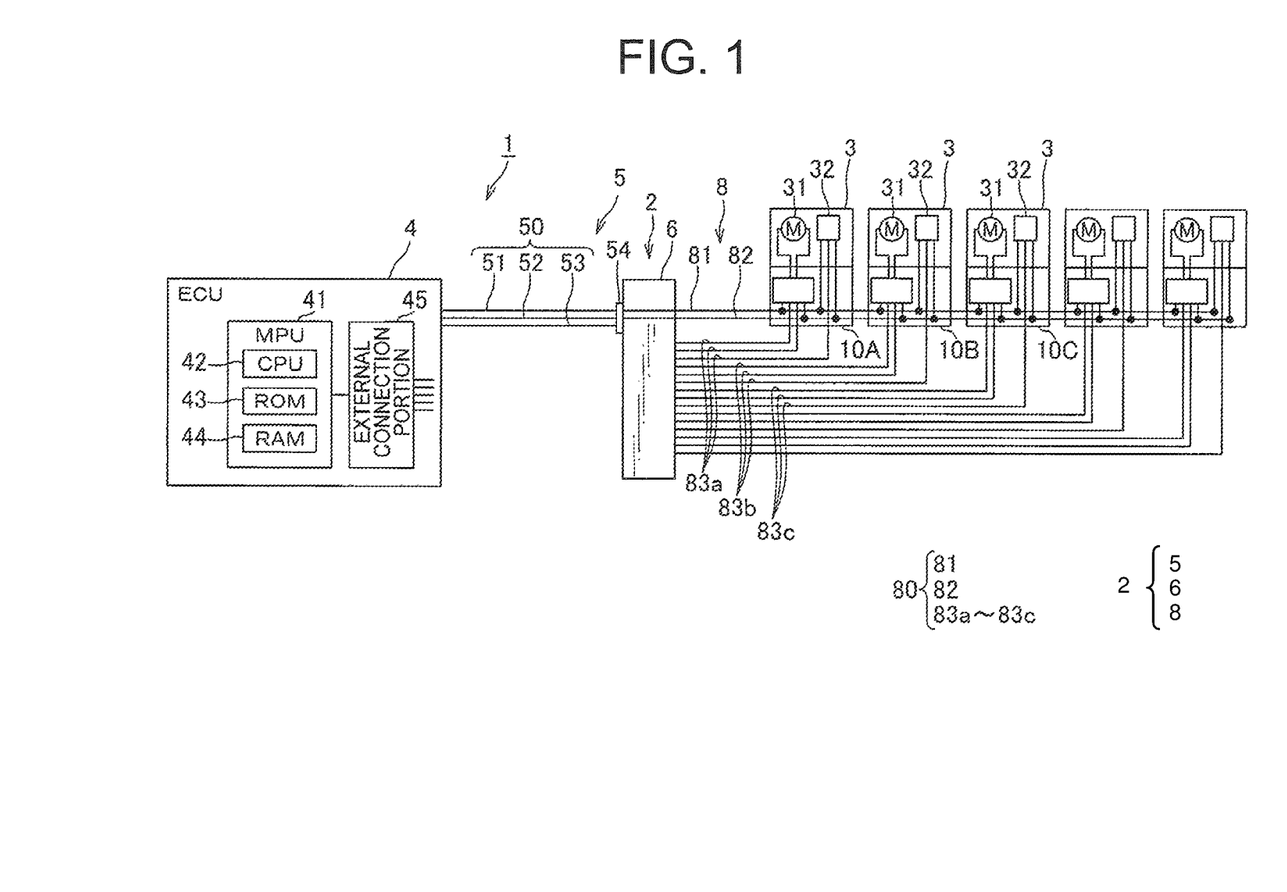
FIG. 1 illustrates a configuration of one embodiment of a wire harness structure and an electronic device control system.

An electronic device control system shown in FIG. 1 is mounted to a vehicle not shown. As shown in FIG. 1, this electronic device control system 1 includes a plurality of loads 3 as electronic devices, an electronic control unit (ECU) 4 and a wire harness structure 2. This electronic device control system 1 is a system arranged to communicatably-connect the plurality of loads 3 with the ECU 4 using the wire harness structure 2 to control the plurality of loads 3 by the ECU 4.

The plurality of loads 3 is a device of various kinds to be controlled by the ECU 4. In one example, in case of being mounted to a vehicle, the plurality of loads 3 includes: a motor body 31 such as a slide motor, a front up motor, a seat lift motor, a reclining motor, a cushion length motor, a head rest motor, a lumbar upper motor and a lumbar lower motor; a sensor body 32 arranged to detect that the motor body 31 has exceeded a predetermined operation range and transmit a detection signal to a relay connector 6; and a plurality of connection terminals (not shown) electrically-connected to these bodies 31, 32. One ends of the connection terminals are connected to the bodies 31, 32 by a wiring pattern of a base plate and an electric wire and such, and the other ends of the connection terminals are connected to a later-described load drive connector 10A, 10B, 10C.

The ECU 4 includes a box-like case not shown and a microprocessor (MPU) 41 housed in the case and arranged to operate according to a predetermined program. As is well known, the MPU 41 may include: a central processing unit (CPU) 42 arranged to perform various processing and controls according to a predetermined program; a ROM 43 which is a read only memory storing a processing program and various information and such for the CPU 42; and a RAM 44 which is a readable and writable memory storing various data and having an area necessary for the processing operation of the CPU 42.

The ROM 43 stores a predetermined constant value N and a processing program which functions as an integrated control unit controlling the CPU 42 so that the supply quantity of power to the plurality of loads 3 does not exceed the predetermined constant value N.

The ECU 4 further includes an external connection portion 45. The external connection portion 45 includes a communication interface (not shown) connected to the above-described CPU 42, the communication interface being arranged to perform a multiplexed communication with the load 3 and being compliant with a predetermined communication protocol (e.g., LIN (Local Interconnect Network)). The ECU 4 transmits the multiplexed control signal to the later-described relay connector 6 of the wire harness structure 2.

Figure 2:
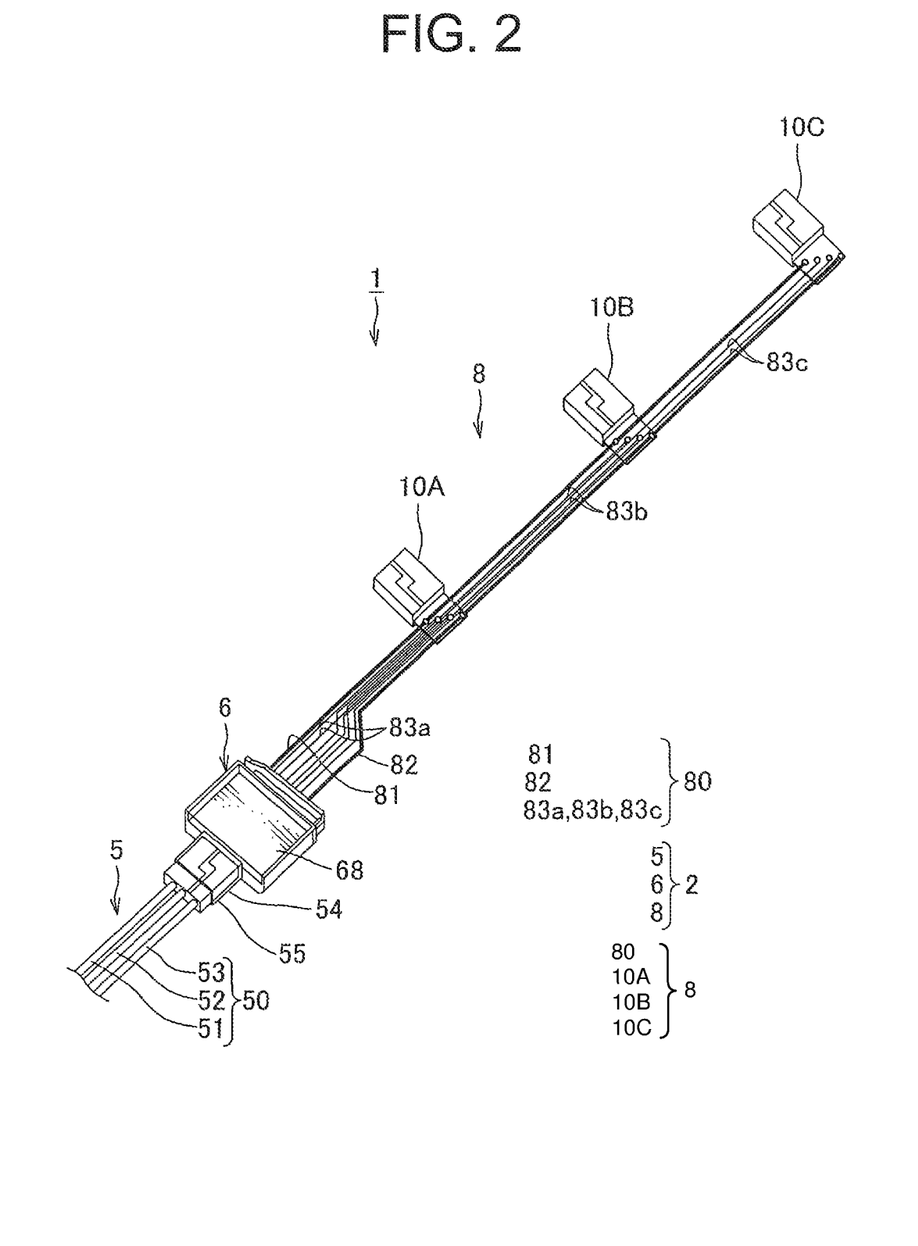
FIG. 2 is a perspective view showing the wire harness structure constituting the electronic device control system shown in FIG. 1.

As shown in FIG. 2, the wire harness structure 2 includes a first wire harness 5 connected to the ECU 4, the relay connector 6 connected to the first wire harness 5, and a second wire harness 8 connected to the relay connector 6.

As shown in FIG. 1 and FIG. 2, the first wire harness 5 includes: a bundle of electric wires 50 having one end connected to the external connection terminal 45 of the ECU 4; and a connector 54 provided at the other end of the bundle of electric wires 50 and connected to the relay connector 6. For example, the connector 54 is a so-called female-type connector including three terminal fittings (not shown) and a housing 55 housing the terminal fitting.

The bundle of electric wires 50 includes a first power wire 51 supplying power from the ECU 4 to the relay connector 6, a multiple signal wire 52 as a second signal wire transmitting the multiplexed control signal from the ECU 4 to the relay connector 6, and a ground wire 53.

Figure 3:
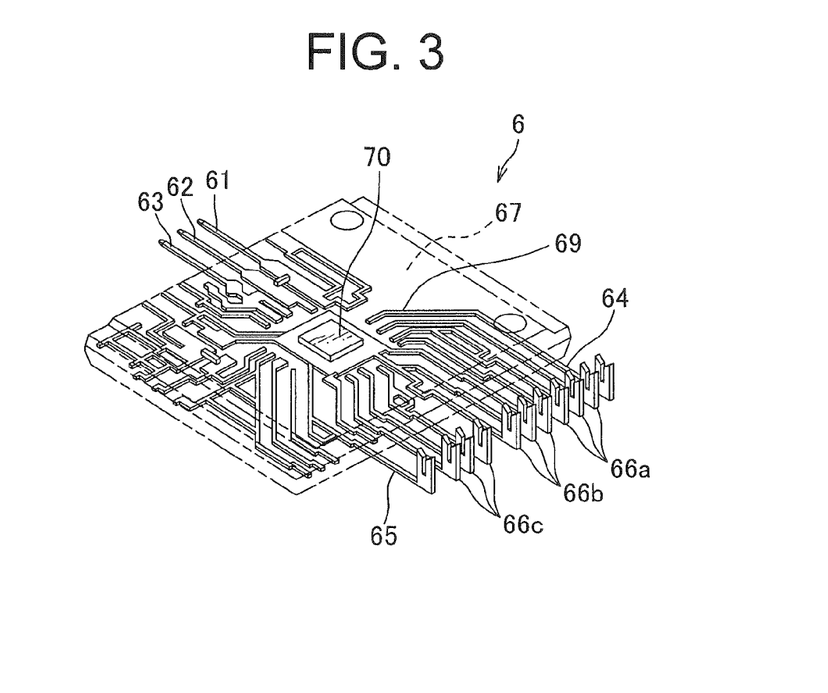
FIG. 3 is a perspective view showing a relay connector constituting the wire harness structure shown in FIG. 2.

As shown in FIG. 3, the relay connector 6 includes: a power terminal fitting 61 to which the first power wire 51 is connected; a signal terminal fitting 62 to which the multiple signal wire 52 is connected; a ground terminal fitting 63 to which the ground wire 53 is connected; a plurality of solderless terminals 64, 65, 66a-66c; a seal body 67; and a connector housing 68 (shown in FIG. 2) arranged to house these terminal fittings 61, 62, 63 and the seal 67. In FIG. 3, the connector housing 68 is omitted. The power terminal fitting 61, the signal terminal fitting 62 and the ground terminal fitting 63 are provided on the side facing the ECU 4, and the plurality of solderless terminal 64, 65, 66a-66c is provided on the side facing the load 3.

The power terminal fitting 61, the signal terminal fitting 62 and the ground terminal fitting 63 are made of conductive metal and are provided at one end of a later-described lead frame 69 of the seal body 67. These terminal fittings 61, 62, 63 are projecting from one of a pair of opposed surfaces of the seal body 67.

The plurality of solderless terminals 64, 65, 66a-66c are made of conductive metal and are provided at one end of the lead frame 69. These solderless terminals 64, 65, 66a-66c are projecting from the other one of the pair of opposed surfaces of the seal body 67. The solderless terminals 64, 65, 66a-66c are formed into a shape of a flat plate bent into a substantially L-like shape and are provided with a pair of pressure contact blades opposed to each other along a width direction.

Of the plurality of solderless terminals 64, 65, 66a-66c, the power solderless terminal 64 is electrically-connected to the power terminal fitting 61. The ground solderless terminal 65 is electrically-connected to the ground terminal fitting 63. The remaining signal solderless terminals 66a-66c are assigned, in advance, the different identification data different from each other for the respective loads 3 connected to the signal solderless terminals 66a-66c.

The number of the plurality of signal solderless terminals 66a-66c may be the number capable of dealing with the maximum number of the loads 3 assumed to be connected (in the shown example, the number of the signal solderless terminals 66a-66c is total of nine, each signal solderless terminal including three solderless terminals assigned the same identification data). If the number of the connected loads 3 is less than the above-mentioned maximum number, then the solderless terminals corresponding to the number of the loads 3 not mounted on the vehicle are not used (i.e. are connected with nothing). Thus, the size of the relay terminal 6 is not increased even when the number of loads 3 connected to the relay connector 6 is increased.

The seal body 67 includes the lead frame 69 and a IC chip 70 attached to the lead frame 69. The seal body 67 is resin sealing the lead frame 69 and the IC chip 70 while the other end of the lead frame 69 and the IC chip 70 are electrically-connected to each other by a known bonding wire. In this manner, the IC chip 70 is electrically-connected with the plurality of terminals 61, 62, 63, 64, 65, 66a-66c. The seal body 67 is positioned between the plurality of solderless terminals 64, 65, 66a-66c and the plurality of terminal fittings 61, 62, 63.

The IC chip 70 includes a central processing unit (CPU), a ROM which is a read only memory and a RAM which is a readable and rewritable memory. The CPU manages various controls in the relay connector 6 and performs various processing in accordance with various processing programs stored in the ROM. The ROM stores various information such as the above-described processing program and a unique communication address which is pre-set in the relay connector 6. Specifically, the IC chip 70 outputs the multiplexed control signal, which is received from the ECU 4, from the signal solderless terminals 66a-66c assigned the identification data contained in the control signal, thereby transmitting the control signal to the loads 3 connected to the signal solderless terminals 66a-66c.

The connector housing 68 houses the terminal fittings 61, 62, 63, the plurality of solderless terminals 64, 65, 66a-66c and the seal body 67. The connector housing 68 is arranged into a flattened rectangular tube-like shape, so that one ends of the power terminal fitting 61, the signal terminal fitting 62 and the ground terminal fitting 63 are exposed from one opening of the connector housing 68 and the plurality of solderless terminals 64, 65, 66a-66c are exposed from the other opening of the connector housing 68. One side of the connector housing 68 in the tube length direction is provided with a hood portion (not shown) into which the connector 54 of the first wire harness 5 is inserted and fitted.

As shown in FIG. 2, the second wire harness 8 includes: a bundle of electric wires 80 having one end connected to the relay connector 6 and the other end drawn out from the relay connector 6; and a plurality of load drive connectors 10A, 10B, 10C to which the bundle of electric wires 80 is connected and to which a power supply unit is embedded.

The bundle of electric wires 80 includes: a second power wire 81 connected to the power solderless terminal 64 of the relay connector 6; a second ground wire 82 connected to the ground solderless terminal 65; and signal wires 83a, 83b, 83c connected to the signal solderless terminals 66a-66c assigned the different identification data, wherein the signal wires 83a, 83b, 83c each includes three wires terminals and wherein the signal solderless terminals 66a-66c each includes three solderless terminals. The first power wire 51 of the first wire harness 5 and the second power wire 81 of the second wire harness 8 may have the same thickness.

The signal wires 83a, 83b, 83c, each including three wires, are connected to the respective loads 3 via the load drive connectors 10A, 10B, 10C. For each signal wire 83a, 83b, 83, two of the three wires are connected to the motor body 31 via the load drive connectors 10A, 10B, 10C to receive the control signal from the relay connector 6, and the remaining one of the three wires is connected to the sensor body 32 via the load drive connectors 10A, 10B, 10C to transmit the detection signal to, for example, the relay connector 6.

Figure 4:
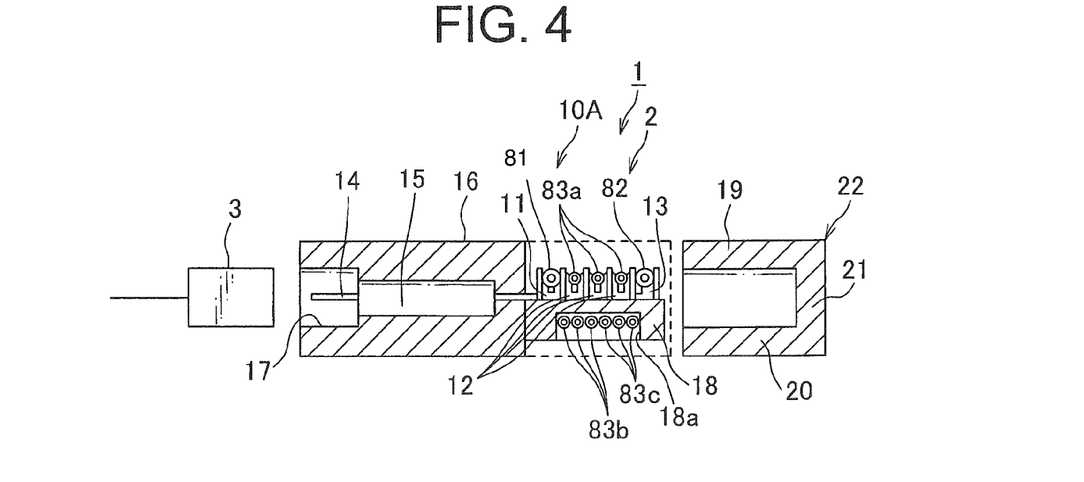
FIG. 4 is a cross-sectional view illustrating how the electronic device control system shown in FIG. 1 is assembled, in which a load is connected to a load drive connector constituting the electronic device control system.

As shown in FIG. 4, each of the load drive connectors 10A, 10B, 10C includes: a power solderless terminal 11 to which the second power wire 81 is press-fitted; a plurality of signal solderless terminals 12 to which each of the three signal wires 83a, the three signal wires 83b and the three signal wires 83c of different identification data are connected; a ground solderless terminal 13 to which the second ground wire 82 is connected; a plurality of terminals 14; a seal body 15; and a connector housing 16 arranged to house the terminals 11-14 and the seal body 15. The power solderless terminal 11, the plurality of signal solderless terminals 12 and the ground solderless terminal 13 are provided on the side facing the relay connector 6 (i.e. the ECU 4), and the plurality of terminals 14 is provided on the side facing the loads 3. Herein, to simplify the explanation, the description is focused on the load drive connectors 10A, 10B, 10C; however, in the present invention, the load drive connectors 10A, 10B, 10C may be equal to or more than three.

The plurality of solderless terminals 11-13 is made of conductive metal and is provided at one end of a later-described lead frame (not shown). In addition, the plurality of solderless terminals 11-13 is projecting from one of a pair of opposed surfaces of the seal body 15. The solderless terminals 11-13 are formed into a flat-plate bent into a substantially L-like shape and are provided with a pair of pressure contact blades opposed to each other along a width direction.

The plurality of terminals 14 is made of conductive metal and is provided at one end of the later-described lead frame. In addition, the plurality of terminals 14 is projecting from the other one of the pair of opposed surfaces of the seal body 15.

The seal body 15 includes a lead frame not shown and a chip not shown attached to the lead frame. Furthermore, the seal body 15 is resin sealing the lead frame and the chip while the other end of the lead frame and the chip are electrically-connected to each other by a known bonding wire. In this manner, the chip and the plurality of terminals 11-14 are electrically-connected to each other. In addition, the seal body 15 is positioned between the plurality of solderless terminals 11-13 and the plurality of terminals 14.

Figure 5:
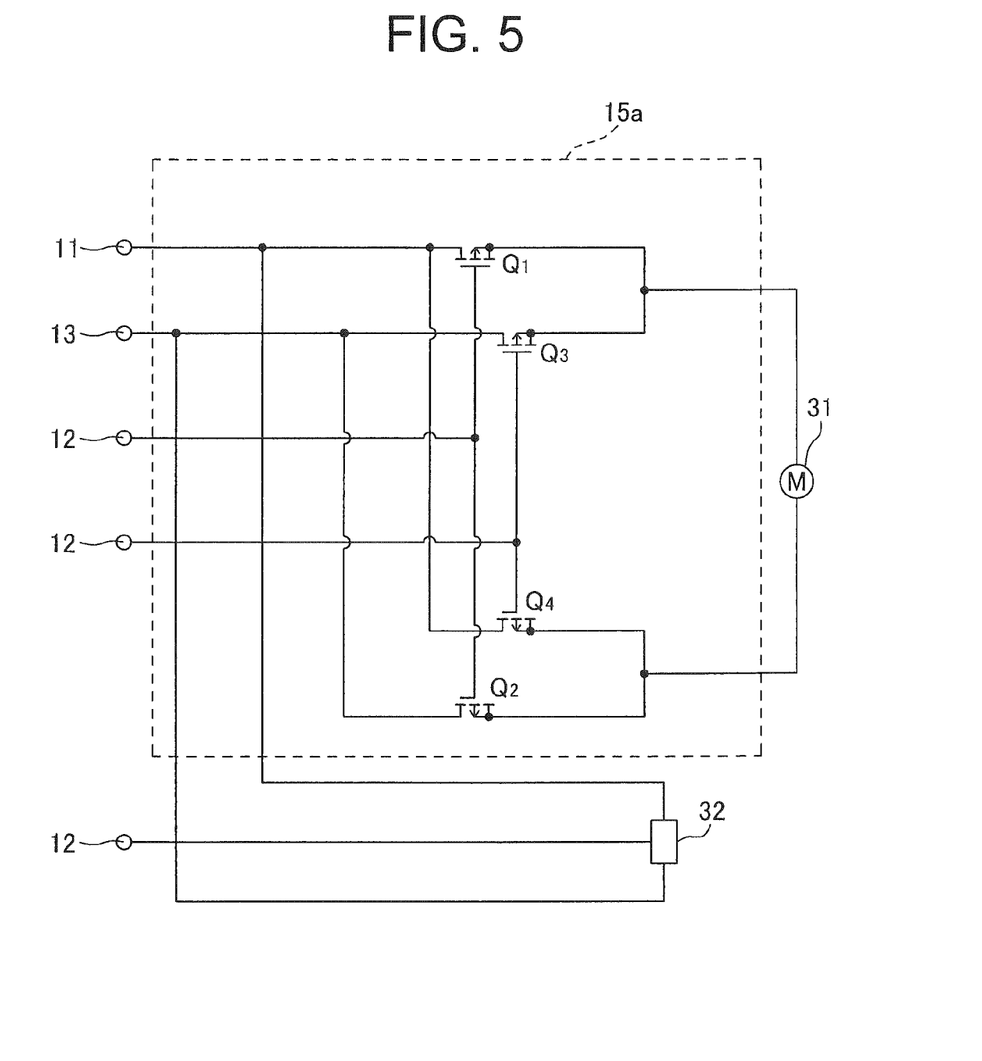
FIG. 5 is a circuit diagram showing an electrical configuration of a chip integrated in the load drive connector shown in FIG. 4.

As shown in FIG. 5, a circuit 15a is embedded in the chip, the circuit 15a supplying the power and the control signal from the plurality of solderless terminals 11-13 to the motor body 31 of the load 3. That is, the circuit 15a functions as a power supply unit and supplies power to the motor body 31 to drive the motor body 31 in accordance with the control signal received from the three signal wires 83a (or signal wires 83b or signal wires 83c) which are separated according to the identification data. The circuit 15a includes a plurality of field-effect transistors (hereinafter called the FET) $Q_1, Q_2, Q_3, Q_4$.

Of the plurality of (four, in the shown example) FET $Q_1, Q_2, Q_3, Q_4$, the FET $Q_1$ is provided between the power solderless terminal 11 and one end of the motor body 31, and the FET $Q_2$ is provided between the ground solderless terminal 13 and the other end of the motor body 31. Furthermore, gate electrodes of the FET $Q_1, Q_2$ are commonly-connected and the gate electrodes of the FET $Q_1, Q_2$ are connected to one of the two signal solderless terminals 12 connected to the motor body 31.

The FET $Q_3$ is provided between the ground solderless terminal 13 and the one end of the motor body 31, and the FET $Q_4$ is provided between the power solderless terminal 11 and the other end of the motor body 31. Furthermore, gate electrodes of the FET $Q_3, Q_4$ are commonly-connected and the gate electrodes of the FET $Q_3$, $Q_4$ are connected to the other one of the two signal solderless terminals 12 connected to the motor body 31.

Next, the operation of the above-described circuit 15a is explained. The circuit 15a starts operating in accordance with an input of an ON signal for driving the motor body 31 received from one of the two signal solderless terminals 12 connected to the motor body 31. When the ON signal for driving the motor body 31 of the load 3 is outputted to the respective gate electrodes of the FET $Q_1$, $Q_2$ from one of the two signal solderless terminals 12 connected to the motor body 31, the conduction is achieved between source electrodes and drain electrodes of the respective FET $Q_1$, $Q_2$ and so the power is supplied to the motor body 31. Thus, the motor body 31 is driven in a rotational direction. Furthermore, when an OFF signal for turning off the drive of the motor body 31 is inputted, the conduction between the source electrodes and the drain electrodes of the respective FET $Q_1$, $Q_2$ is blocked. Thus, the power supply to the motor body 31 is stopped, and the motor body 31 is stopped.

When the ON signal for driving the motor body 31 of the load 3 is outputted to the respective gate electrodes of the FET $Q_3$, $Q_4$ from the other one of the two signal solderless terminals 12 connected to the motor body 31, the conduction is achieved between the source electrodes and drain electrodes of the respective FET $Q_3$, $Q_4$ and so the power is supplied to the motor body 31. Thus, the motor body 31 is driven in an inverse rotational direction. Furthermore, when the OFF signal for turning off the drive of the motor body 31 is inputted, the conduction between the source electrodes and the drain electrodes of the respective FET $Q_3$, $Q_4$ is blocked. Thus, the power supply to the motor body 31 is stopped, and the motor body 31 is stopped.

One end of the sensor body 32 is connected to the power solderless terminal 11, and the other end of the sensor body 32 is connected to the ground solderless terminal 13. The sensor body 32 is also connected to the remaining one of the three signal solderless terminals 12.

The connector housing 16 houses the plurality of solderless terminals 11-13, the terminals 14 and the seal body 15. The connector housing 16 is arranged into a flattened rectangular tube-like shape, so that one ends of the plurality of solderless terminals 11-13 are exposed from one opening of the connector housing 16, and the plurality of terminals 14 are exposed from the other opening of the connector housing 16. The connector housing 16 integrally includes a hood portion 17 and a base plate portion 18, the hood portion 17 being arranged at one side in the tube length direction and arranged such that the load 3 is inserted and fitted, and the base plate portion 18 being arranged at the other side in the tube length direction and including one surface for mounting the plurality of solderless terminals 11-13.

The base plate portion 18 provided at the other side of the connector housing 16 in the tube length direction includes one end continued to the connector housing 16 and the other end extending in a direction away from the hood portion 17. Furthermore, the base plate portion 18 has the one surface mounted with the plurality of solderless terminals 11-13 and the other surface provided with a groove portion 18a formed concave with respect to the other surface.

As shown in FIG. 4, the groove portion 18a accommodates the signal wires 83b, 83c, each including three wires, of the signals wires 83a, 83b, 83c; the signal wires 83b, 83c transmitting the control signal containing identification data other than the identification data corresponding to the load drive connector 10A having the groove portion 18a.

Furthermore, a connector cover 22 is attached to the connector housing 16, the connector cover 22 being formed into shape and including a first cover portion 19 covering the plurality of solderless terminals 11-13 mounted to the one surface of the base plate portion 18, a second cover portion 20 covering an opening of the groove portion 18a, and a connection portion 21 connecting ends of the first cover portion 19 and the second cover portion 20 located distant from the connector housing 16.

Next, one example of an assembling method of the electronic device control system 1 described above is explained.

Firstly, one end of the bundle of electric wire 50 of the first wire harness 5 is connected to the external connection portion 45 of the ECU 4. In this manner, the ECU 4 and the first wire harness 5 are connected to each other. Next, the connector 54 of the first wire harness 5 is fitted to the relay connector 6. In this manner, the power terminal fitting 61 and the first power wire 51 are connected to each other, and the signal terminal fitting 62 and the multiple signal wire 52 are connected to each other, and the ground terminal fitting 63 and the ground wire 53 are electrically-connected to each other. In this manner, the ECU 4 and the relay connector 6 are connected to each other via the first wire harness 5.

Next, the second power wire 81 is press-fitted to the power solderless terminal 64 of the relay connector 6, and the second ground wire 82 is press-fitted to the ground solderless terminal 65, and the signal wires 83a, 83b, 83c, each having three wires and containing the same identification data, are press-fitted to the signal solderless terminals 66a-66c each including three solderless terminals.

Next, the second power wire 81 is press-fitted to the power solderless terminal 11 of the load drive connector 10A, and the three signal wires 83a containing the same identification data are press-fitted to the plurality of signal solderless terminals 12, respectively, and the second ground wire 82 is press-fitted to the ground solderless terminal 13. In this manner, the load drive connector 10A is electrically-connected with the second power wire 81, the three signal wires 83a and the second ground wire 82. Then, the signal wires 83b, 83c, each including three wires, are accommodated in the groove portion 18a. In this manner, the load drive connector 10A and the relay connector 6 are connected to each other. When connecting the load drive connector 10B and the relay connector 6 together, each of the three signal wires 83b containing the same identification data is press-fitted to each of the three signal solderless terminals 12, and when connecting the load drive connector 10C and the relay connector 6 together, each of the three signal wires 83c containing the same identification data is press-fitted to each of the three signal solderless terminals 12.

Furthermore, in a state in which the second power wire 81, the second ground wire 82 and the three signal wires 83a are press-fitted to the plurality of solderless terminals 11-13 and the three signal wires 83b, 83c are accommodated in the groove portion 18a, the connector cover 22 is moved closer to the connector housing 16 such that the first cover portion 19 covers the solderless terminals 11-13 and that the second cover portion 20 covers the opening of the groove portion 18a. In this manner, the connector cover 22 is attached to the connector housing 16.

Next, the loads 3 are fitted to the load drive connectors 10A, 10B, 10C, respectively. Thus, the connection terminals provided to the loads 3 are electrically-connected to the terminals 14 of the load drive connectors 10A, 10B, 10C. In this manner, the relay connector 6 is connected to the second wire harness 8, and the electronic device control system 1 is assembled.

Figure 6:
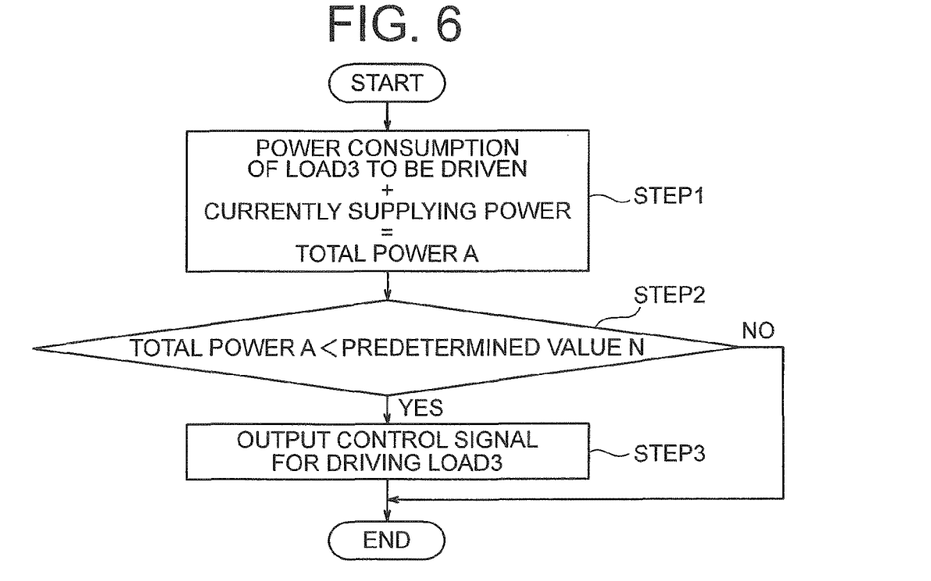
FIG. 6 is a flow chart indicating a processing procedure of an ECU.

Next, the operation of the ECU 4 incorporated in the above-described electronic device control system 1 and arranged to function as an integrated control unit, and the operation according to the present invention are explained in reference to FIG. 6. FIG. 6 is a flow chart showing the operation of the ECU 4 constituting the electronic device control system shown in FIG. 1.

Firstly, the ECU 4 starts operating in accordance with a drive signal inputted from outside. When a drive signal ON for the load 3 to be driven is inputted, the ECU 4 computes a total power A by summing the power consumption of the load 3 to which the drive signal ON is inputted and the currently supplying power (step S1) and judges whether or not the total power A exceeds a predetermined constant value N (step S2).

If the total power A is equal to or less than the predetermined value N (i.e. "Y" in step S2), then the identification data of the load 3 to be driven is added and the control signal for driving this load 3 is outputted to the relay connector 6 (step S3). Then, this load 3 is driven, and the ECU 4 confirms that this load 3 is driven and turns on a drive flag of this load 3.

While on the other hand, if the total power A is more than the predetermined value N (i.e. "N" in step S2), the process ends.

When the drive signal OFF is inputted from outside while the drive flag of the driving load 3 is turned on, the ECU 4 adds the identification data of the driving load 3 and outputs the control signal for stopping the driving load 3 to the relay connector 6. Then, the driving load 3 stops, and the ECU 4 confirms that the load 3 is stopped (i.e. no power is supplied to the load 3) and turns off the drive flag of the stopped load 3.

Figure 7:
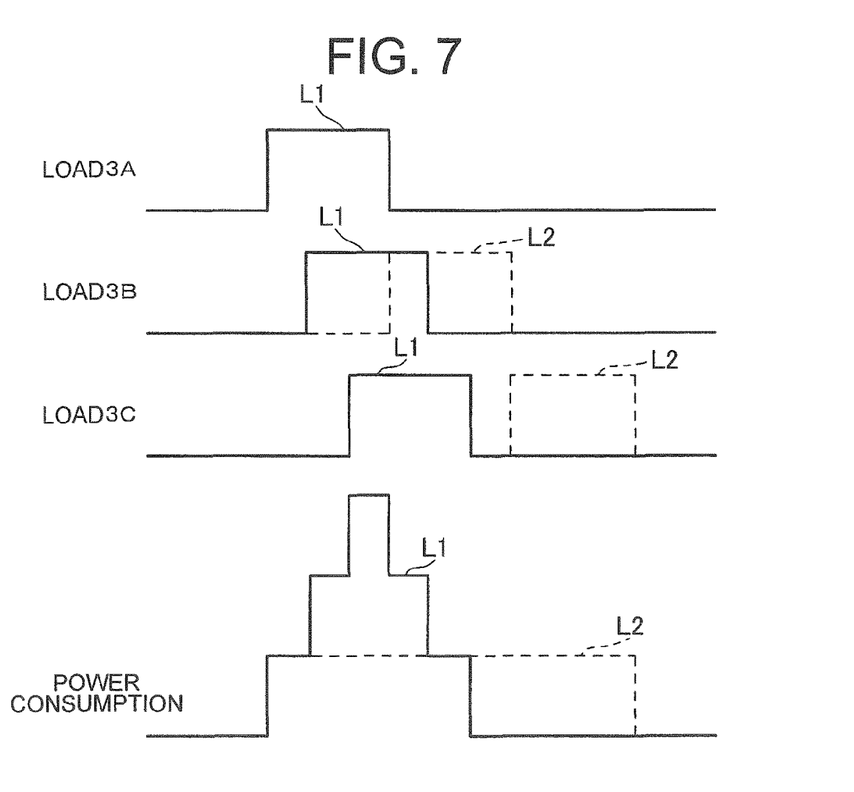
FIG. 7 illustrates a relationship between a drive condition of the load and a consumption current of the load.

According to the above-described operation, since the ECU 4 includes the integrated control unit, even if the drive signal ON for a second load 3 is inputted while a first load 3 is driving, the second load 3 is not driven if the total power A which is sum of the power consumption of the second load 3 and the currently supplying power the power consumption of the driving load 3) exceeds the predetermined value N, as shown in FIG. 7. Furthermore, even if the drive signal ON for a third load 3 is inputted while the first load 3 is driving, the third load 3 is not driven if the total power A which is sum of the power consumption of the third load 3 and the currently supplying power (i.e. the power consumption of the driving load 3) exceeds the predetermined value N.

For example, in the conventional art, as indicated by L1 in FIG. 7, when the drive signal ON for a second load 3B is inputted while a first load 3A is driving, the second load 3B is driven. Also, when the drive signal ON for a third load 3C is inputted while the loads 3A, 3B are driving, it is necessary to supply power (current) to simultaneously drive all of the loads 3A, 3B, 3C controlled by the ECU 4. In contrast, in the present invention, since the ECU 4 includes the integrated control unit, it is controlled such that the total power A, which is sum of the power consumption of the driving load 3 and the currently supplying power, does not exceed the predetermined constant value N, as indicated by L2 (dotted line). Thus, the supply quantity of power for all of the loads 3A, 3B, 3C controlled by the ECU 4 can be equalized.

As described above, according to the embodiment described above, when the drive signal ON for the second load 3B is inputted while the first load 3A is driving, the second load 3B is not driven because the total power A, which is sum of the power consumption of the second load 3B and the currently supplying power (i.e. the power consumption of the load 3A), exceeds the predetermined value N. However, the present invention is not limited to this. That is, the second load 3B may be driven when the drive signal ON for the second load 3B is inputted during the first load 3A is driving, if the total power A, which is sum of the power consumption of the second load 3 and the currently supplying power (i.e. the power consumption of the driving load 3), is equal to or less than the predetermined value N. Also, the third load 3C may be driven when the drive signal ON for the third load 3C is inputted during the first load 3A is driving, if the total power A, which is sum of the power consumption of the third load 3C and the currently supplying power (i.e. the power consumption of the driving load 3A), is equal to or less than the predetermined value N. In other words, two or more loads 3A, 3B, 3C may be driven simultaneously if the total power A, which is total power consumed when the plurality of loads 3A, 3B, 3C controlled by the ECU 4 is driven simultaneously, does not exceed the predetermined constant value N.

Figure 8:
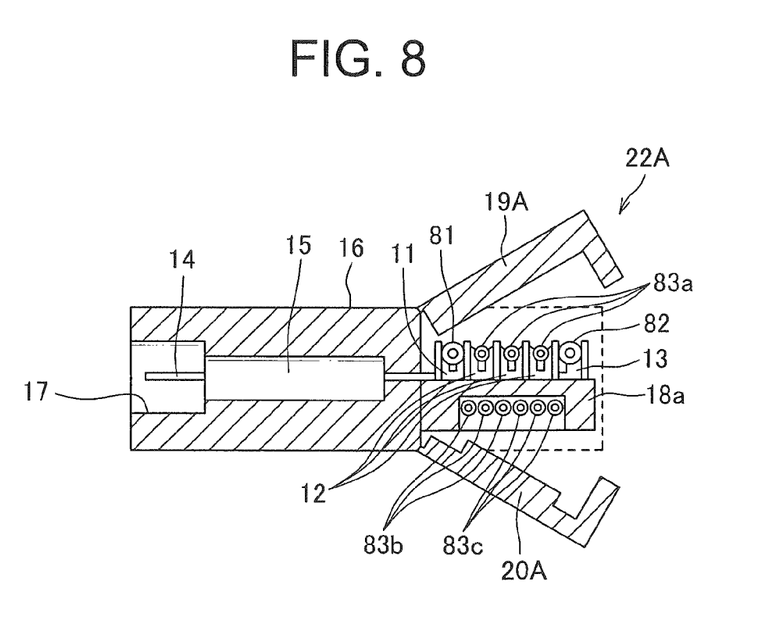
FIG. 8 illustrates a modified example of the load drive connector shown in FIG. 4.

Furthermore, according to the embodiment described above, the connector housing 16 is provided with the connector cover 22 which is separate from the connector housing 16 and which is formed into the U-like shape with the first cover portion 19, the second cover portion 20 and the connection portion 21 connecting the ends of the first cover portion 19 and the second cover portion 20. However, the present invention is not limited to this. As shown in FIG. 8, the connector cover may be arranged as a connector cover 22A including a first cover portion 19A and a second cover portion 20A each formed into a L-like shape and each has one end rotatably attached to the connector housing 16 by a hinge. Such arrangement can prevent the connector cover 22A from being dropped off or lost during the assembling of the electronic device control system 1, and thus the assembling workability is improved even more. In FIG. 8, the elements similar to the aforementioned embodiment are indicated by like references to omit explanation.

Figure 9:
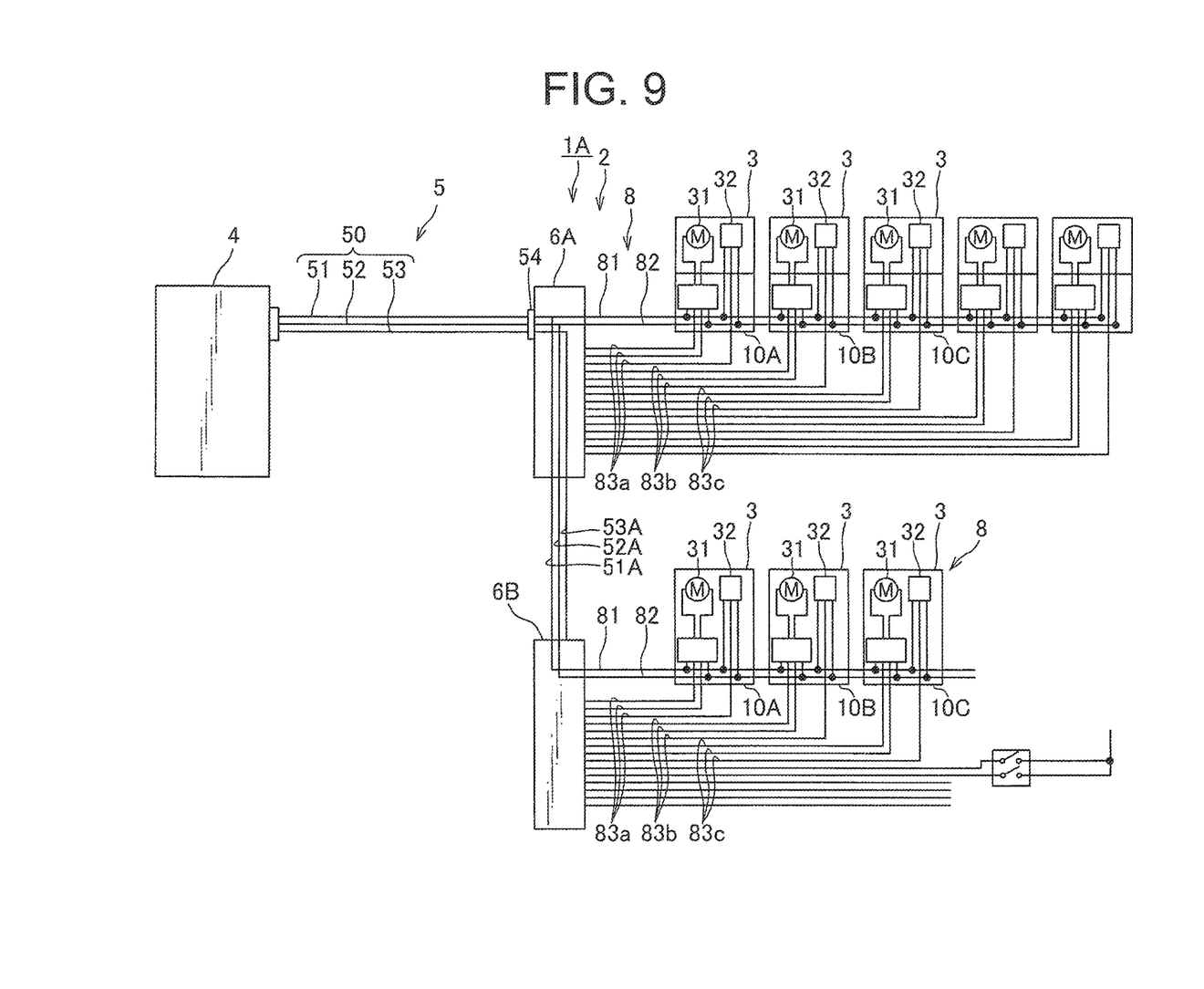
FIG. 9 illustrates a modified example of the electronic device control system shown in FIG. 1.
Figure 10:
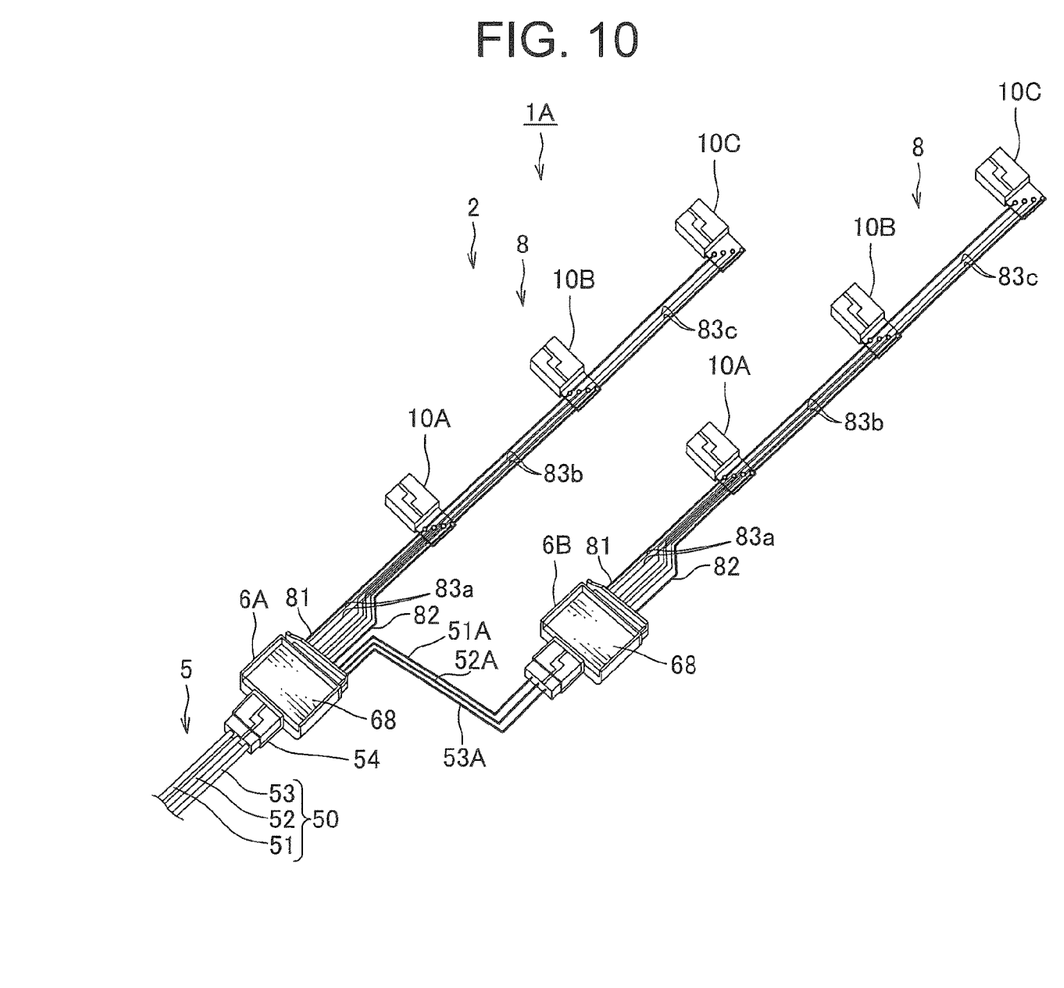
FIG. 10 is a perspective view showing another modified example of the electronic device control system shown in FIG. 9.

According to the embodiment described above, the single relay connector 6 is connected to the ECU 4 via the first wire harness 5. However, the present invention is not limited to this, and two or more relay connectors 6 may be connected to the ECU 4 via the first wire harness 5. FIG. 9 and FIG. 10 show an electronic device control system 1A connected to two or more relay connectors 6A, 6B connected to the ECU 4 via the first wire harness 5. The electronic device control system 1A includes a branch power wire 51A branched from the first power wire 51 of the first wire harness 5, a branch ground wire 53A branched from the ground wire 53 of the first wire harness 5 and a branch signal wire 52A branched from the multiple signal wire 52 of the first wire harness 5.

To connect the plurality of relay connectors 6A, 6B to the ECU 4, the branch power wire 51A branched from the first power wire 51 of the first wire harness 5 is drawn out from the relay connector 6A and connected to the power terminal fitting 61 of the relay connector 6B, and the branch ground wire 53A branched from the ground wire 53 of the first wire harness 5 is drawn out from the relay connector 6A and connected to the ground terminal fitting 63 of the relay connector 6B, and the branch signal wire 52A branched from the multiple signal wire 52 of the first wire harness 5 is drawn out from the relay connector 6A and connected to the signal terminal fitting 62 of the relay connector 6B. In doing so, the number of plurality of loads controlled by one ECU 4 can be increased without increasing the size of the relay connector 6, 6A, 6B. In FIG. 9 and FIG. 10, the elements similar to the aforementioned embodiment are indicated by like references to omit explanation.

Figure 11:
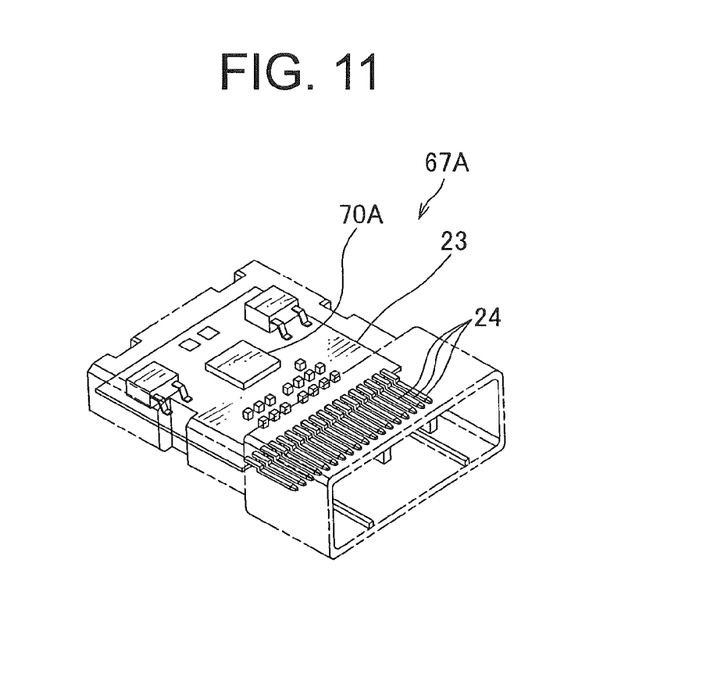
FIG. 11 illustrates yet another modified example of the electronic device control system shown in FIG. 1.

Furthermore, according to the embodiment described above, the seal body 15, 67 includes the lead frame 69 and the chip 70 attached to the lead frame 69. However, the present invention is not limited to this. As shown in FIG. 11 showing a seal body 67A, the seal body 15, 67 may include a chip 70A, a circuit board 23 mounted with the chip 70A and a plurality of terminals 24 electrically-connected to a wiring pattern of the circuit board 23.

Furthermore, according to the embodiment described above, the microprocessor (MPU) 41 constituting the ECU 4 is housed in a box-like case not shown. However, the present invention is not limited to this, and the microprocessor (MPU) 41 may be housed in an electrical junction box for distributing power from the power source side.

Furthermore, according to the embodiment described above, the integrated control unit is included in the ECU 4; however the present invention is not limited to this, and the integrated control unit may be included in the relay connector 6, 6A, 6B.

According to the embodiment described above, the plurality of power supply units, which supplies power to the respective loads 3 as the electronic devices in accordance with the control signal from the ECU 4 as the electronic control unit, is connected to the second power wire 81 as the power wire and to the second ground wire 82 as the ground wire drawn out from the relay terminal 6, 6A, 6B. In other words, the power supply unit is provided at outside of the relay connector 6, 6A, 6B. Thus, the relay connector 6, 6A, 6B does not increase in size even if the number of the loads 3 controlled by the ECU 4 is increased, and also, it eliminates the need for preparing the relay connector 6, 6A, 6B for each of the combinations of the plurality of loads 3 mounted to the vehicle, thereby achieving the standardization of the relay connector 6, 6A, 6B. Consequently, there is provided the wire harness structure 2 having improved design performance and improved productivity and which can reduce the cost, and there is provided the electronic device control system 1 having such wire harness structure 2.

Furthermore, as described above, the above-described power supply unit is embedded in the load drive built-in connector 10A, 10B, 10C which serves as a connector connecting the loads 3 with the second power sire 81, the second ground wire 82 and the signal wires 83a, 83b, 83c. Thus, the loads 3 can be electrically-connected with the load drive built-in connectors 10A, 10B, 10C by connector coupling the loads 3 to the load drive built-in connector 10A, 10B, 10C in which the above-described power supply unit is embedded, thereby improving the assembling workability. In addition, the load drive built-in connector 10A, 10B, 10C in which the power supply unit is embedded can be commonly-used for the plurality of loads 3, and thus the load drive built-in connector 10A, 10B, 10C can be standardized, thereby improving the design performance and the productivity and thus reducing the cost.

Furthermore, as described above, the second power wire 81 and the signal wires 83a, 83b, 83c transmitting control signal corresponding to one load 3 of the plurality of loads 3 can be electrically-connected to the plurality of solderless terminals 11-13 simply by press-fitting the second power wire 81 and the signal wires 83a, 83b, 83c transmitting the control signal corresponding to one of the plurality of loads 3 to the plurality of solderless terminals 11-13, respectively. Thus, the assembling workability is improved even more.

Furthermore, as described above, the load drive built-in connector 10 includes the base plate portion 18 having one surface arranged to be mounted with the plurality of solderless terminal 11-13 and the other end provided with the groove portion 18a, the groove portion 18a formed concave with respect to the other surface to house the signal wires 83a, 83b, 83c transmitting the control signal corresponding to the loads 3 other than said one load 3. Thus, the signal wires 83a, 83b, 83c transmitting the control signal corresponding to the loads 3 other than said one load 3 can be wired in a non-voluminous and organized fashion, and thus the wire harness structure 2 can be downsized.

Furthermore, as described above, the first cover portion 19, 19A covering the plurality of solderless terminals 11-13 mounted on the one surface of the base plate portion 18 and the second cover portion 20, 20A covering the opening of the groove portion 18a are provided. Thus, the second power wire 81, the signal wires 83a, 83b, 83c transmitting control signal corresponding to one load 3 of the plurality of loads 3, and the signal wires 83a, 83b, 83c transmitting control signal corresponding to the loads 3 other than said one load 3 which are press-fitted to the plurality of solderless terminals 11-13 can be protected and fixed between the first cover portion 19, 19A and the second cover portion 20, 20A.

Furthermore, as described above, the relay connector 6, 6A, 6B includes the integrated control unit arranged to control such that the supply quantity of power to the plurality of loads 3 does not exceed the predetermined constant value N. Thus, the supply quantity of power to the plurality of loads 3 can be equalized. Consequently, the second power wire 81 drawn out from the relay connector 6, 6A, 6B can have a small diameter and can be downsized.

The embodiments described herein are only representative embodiment of the present invention, and the present invention is not limited to these. That is, the present invention can be modified in various ways and implemented tout departing from the gist of the present invention.

REFERENCE SIGN LIST 1, 1A electronic device control system
2 wire harness structure
3 plurality of loads (electronic devices
4 ECU (electronic control unit)
52 multiple signal wire (second signal wire)
6, 6A, 6B relay connector
81 second power wire (power wire)
82 second ground wire (ground wire)
83a, 83b, 83c signal wire
10A, 10B, 10C load drive built-in connector (connector)
18 base plate portion
18a groove portion
19, 19A first cover portion
20, 20A second cover portion

The invention claimed is:

1. A wire harness structure arranged to communicably-connect a plurality of electronic devices to be mounted on a vehicle with an electronic control unit controlling the plurality of electronic devices, the wire harness structure comprising:

a relay connector arranged to relay a control signal from the electronic control unit to the plurality of electronic devices;

a power wire and a ground wire drawn out from the relay connector, each including one wire;

a plurality of power supply units connected to the power wire and the ground wire; and a plurality of signal wires transmitting the control signal from the relay connector to each of the plurality of power supply units, each signal wire being connected to the relay connector and to each power supply unit, wherein each power supply unit supplies power to the electronic device and drives the electronic device in accordance with the control signal from the signal wire.

2. The wire harness structure according to claim 1, wherein each power supply unit is embedded in a connector connecting the electronic device to the power wire, the ground wire and the signal wire.

3. The wire harness structure according to claim 2, wherein the connector includes a plurality of solderless terminals, wherein the power wire, the ground wire and the signal wires transmitting the control signal corresponding to one electronic device of the plurality of electronic devices are press-fitted and connected to the plurality of solderless terminals, and wherein each solderless terminal is electrically-connected to the power supply unit.

4. The wire harness structure according to claim 3, wherein the connector includes a base plate portion having one surface arranged to be mounted with the plurality of solderless terminals, wherein the other surface of the base plate portion is provided with a groove portion formed concave with respect to the other surface, the groove portion being arranged to house the signal wires transmitting the control signal corresponding to the electronic device other than said one electronic device.

5. The wire harness structure according to claim 4, further comprising:
a first cover portion covering the plurality of solderless terminals mounted on the one surface of the base plate portion; and
a second cover portion covering an opening of the groove portion.

6. An electronic device control system comprising:
a plurality of electronic devices to be mounted on a vehicle;
an electronic control unit controlling the plurality of electronic devices; and
the wire harness structure described in claim 1 arranged to communicably-connect the plurality of electronic devices with the electronic control unit,
wherein the wire harness structure includes a second signal wire transmitting the control signal from the electronic control unit to the relay connector.

7. An electronic device control system comprising:
a plurality of electronic devices to be mounted on a vehicle;
an electronic control unit controlling the plurality of electronic devices; and
the wire harness structure described in claim 2 arranged to communicably-connect the plurality of electronic devices with the electronic control unit,
wherein the wire harness structure includes a second signal wire transmitting the control signal from the electronic control unit to the relay connector.

8. An electronic device control system comprising:
a plurality of electronic devices to be mounted on a vehicle;
an electronic control unit controlling the plurality of electronic devices; and
the wire harness structure described in claim 3 arranged to communicably-connect the plurality of electronic devices with the electronic control unit,
wherein the wire harness structure includes a second signal wire transmitting the control signal from the electronic control unit to the relay connector.

9. An electronic device control system comprising:
a plurality of electronic devices to be mounted on a vehicle;
an electronic control unit controlling the plurality of electronic devices; and
the wire harness structure described in claim 4 arranged to communicably-connect the plurality of electronic devices with the electronic control unit,
wherein the wire harness structure includes a second signal wire transmitting the control signal from the electronic control unit to the relay connector.

10. An electronic device control system comprising:
a plurality of electronic devices to be mounted on a vehicle;
an electronic control unit controlling the plurality of electronic devices; and
the wire harness structure described in claim 5 arranged to communicably-connect the plurality of electronic devices with the electronic control unit,
wherein the wire harness structure includes a second signal wire transmitting the control signal from the electronic control unit to the relay connector.

11. The electronic device control system according to claim 6, wherein the electronic control unit or the relay connector includes an integrated control unit arranged to control such that supply quantity of power to the plurality of electronic devices does not exceed a predetermined constant value.

* * * * *